Jan. 27, 1925. 1,524,318
T. J. SCOTT
VALVE FOR EXHAUST PIPES OF AUTO VEHICLES
Original Filed Nov. 21, 1921 2 Sheets-Sheet 1
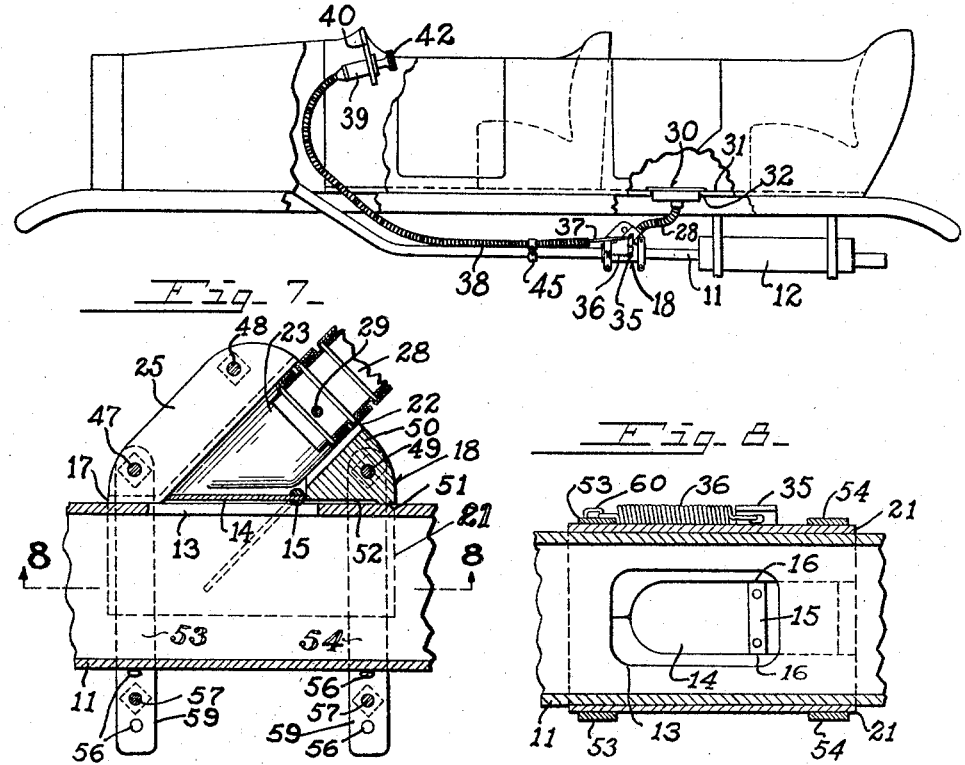
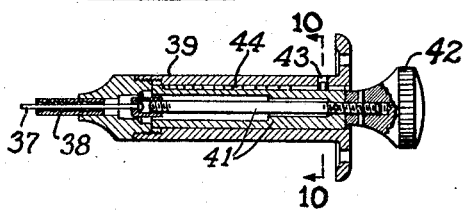
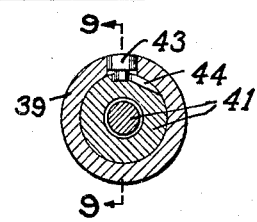
INVENTOR.

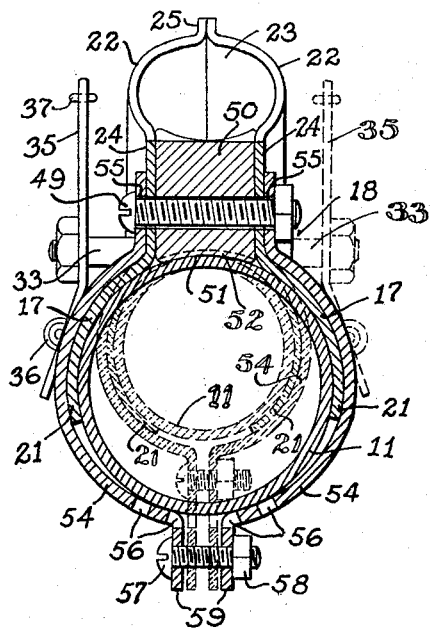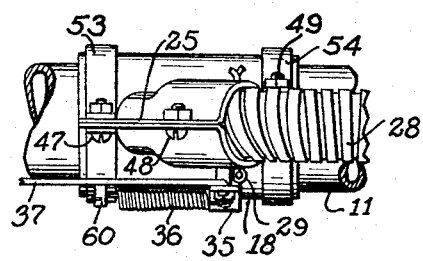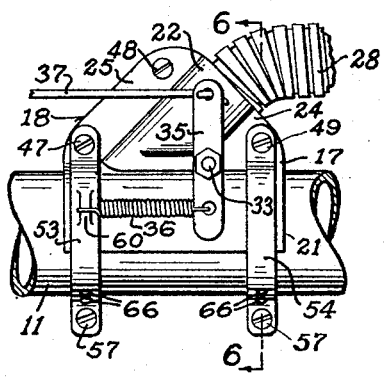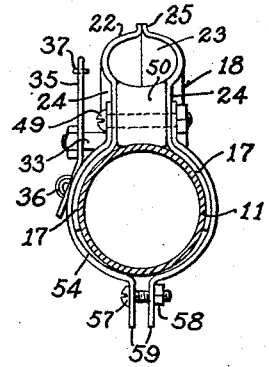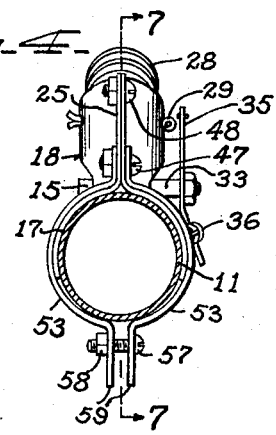

Patented Jan. 27, 1925.

1,524,318

UNITED STATES PATENT OFFICE.

TOM J. SCOTT, OF CINCINNATI, OHIO.

VALVE FOR EXHAUST PIPES OF AUTO VEHICLES.

Original application filed November 21, 1921, Serial No. 516,594. Divided and this application filed March 29, 1924. Serial No. 702,784.

*To all whom it may concern:*

Be it known that I, TOM J. SCOTT, a citizen of the United States, residing at Cincinnati, in the county of Hamilton and State of Ohio, have invented certain new and useful Improvements in Valves for Exhaust Pipes of Auto Vehicles, of which the following is a specification.

It is the object of my invention to provide a novel valve for exhaust-pipes of auto vehicles having engines of the internal combustion type, so arranged that the valve may be readily applied to exhaust-pipes of various diameters; to provide novel means whereby the operation may be had from either side of the exhaust pipe; to provide a pluri-part casing for the exhaust-valve and a positioning part between the parts in novel manner; and to provide novel adjustable clamping means for attaching the device to the exhaust-pipe.

The invention will be further readily understood from the following description and claims, and from the drawings, in which latter:

Fig. 1 is a side elevation of my improved device, showing the same attached to an auto vehicle.

Fig. 2 is a plan view of my improved device, with the pipes partly broken away.

Fig. 3 is a side elevation of the same.

Fig. 4 is a front end elevation of the same.

Fig. 5 is a rear end elevation of the same.

Fig. 6 is a cross-section of the same, taken on the line 6—6 of Fig 3, showing the same arranged for clamping about an exhaust-pipe of larger diameter and having the operating arm at one side, in full lines, and showing the same clamped about an exhaust-pipe of smaller diameter and with the operating arm at the other side of the same, in dotted lines.

Fig. 7 is an axial section of the same, taken on the line 7—7 of Fig. 4.

Fig. 8 is an axial section of the same, taken in the plane of the line 8—8 of Fig. 7.

Fig. 9 is an axial section of the valve operating means, taken in the plane of the line 9—9 of Fig. 10; and, Fig. 10 is a cross-section of the same, taken in the plane of the line 10—10 of Fig. 9.

I have shown my improved device as applied for regulating the supply of heat to a heater in the floor of an auto vehicle.

My present application is a division of an original application for patent on improvements in heaters for automobiles, filed by me in the United States Patent Office on November 21, 1921, Serial No. 516,594, in which my invention is shown and described but not claimed.

The usual exhaust-pipe from the internal combustion engine of an auto vehicle is shown at 11, discharging into a usual muffler 12. An opening 13 is provided in this exhaust-pipe. A pivoted valve 14 is arranged to normally close this opening. The valve is fixed to a stem 15 which is journaled in bearing-holes 16 located in the respective sides 17 of a valve-casing 18.

This valve-casing is formed of two mating sides struck up out of sheet-metal. It is exemplified as a clamp received about the exhaust-pipe. Each side comprises an arcuate portion 21, a wall-section 22 of a passage 23, a web 24 connecting said wall-section and arcuate portion, and a flange 25 above said wall-section. The wall-sections are at an angle to the arcuate portions. The portion of the side above the arcuate portion forms a rigid structure by reason of the manner in which the sheet-metal is formed, while flexure of the arcuate portion is permitted to change its arc of curvature to correspond with exhaust-pipes of different diameters.

The opening 13 in the exhaust-pipe communicates with the passage 23, this communication being regulated by the valve 14. A branch pipe, shown as a flexible pipe 28, connects with the passage 23, and is arranged to be secured between the walls of said passage, being preferably clamped by the walls of said passage when the parts are in assembled relation. A cotter-pin 29 passes through the walls of said passage and said pipe. The flexible pipe 28 is shown as communicating with a heater 30, shown in the floor 31 of the auto vehicle, being located in an opening 32 formed in said floor, but may be directed to any other suitable device. Said passage 23 forms an exhaust passage. The valve may serve as a cut-out valve.

The valve-stem has an extended shank 33.

An operating arm 35 is fixed to the extended shank and is normally retracted to close the valve by means of a spring 36.

An operating link 37 connects with the operating arm. This operating link is of a flexible comparatively stiff wire and operates longitudinally in a flexible guide 38, made, for instance, of spirally wound wire to form a guide for the operating link.

One end of the guide is secured to a barrel 39, which is fixed to the usual instrument-board 40 of an automobile. An operating shank 41 is axially movable in this barrel by means of a handle 42. The end of the flexible link is secured to this shank. The shank is axially movable to more or less extent to determine the degree of opening of the valve 14 and is arranged to be secured in adjusted positions by slightly turning the shank in order to place a pin 43 secured in the barrel selectively in notches 44 in the outer face of the wall of the shank, to regulate the valve, and to position the same with relation to the opening 13 in the exhaust-pipe for diverting more or less exhaust from the exhaust-pipe through the passage 23. The flexible guide 38 may be secured to the exhaust-pipe at a suitable point by means of a clip 45.

The valve-casing 18 is arranged to be secured to exhaust-pipes of different diameters. Different auto vehicles have exhaust-pipes of different diameters, so that this device may be applied to different kinds of auto vehicles, whether automobiles, trucks, tractors or of other character. The two sides of the valve-casing are arranged to be secured together by means of bolts 47, 48, 49, provided with suitable nuts. At the pivot end of the valve-casing there is a block 50 which forms a separating block between the rear ends of the casing-sections. It is located between the webs 24 and is part of the wall of the passage 23.

The bolt 49 is received through the block 50 and clamps the block and the rear ends of the casing-sections together. The parting plane between the sections is at the median portion of the valve. The bolts 47, 48, are received through the flanges 25. The separating block comprises a flange 51 arranged to conform to the curvature of the exhaust-pipe, there being a space 52 normally between the exhaust-pipe and the body of the block, for enabling the flange to be readily formed, as by filing, to conform to the cross-sectional curvature of the exhaust-pipe about which the clamp is to be received.

The depending portions of the casing-sections which are received about the exhaust-pipe extend only partway about the exhaust-pipe and are arranged to be bent or flexed upon arcs of circles of different diameters, corresponding to the diameters of the respective exhaust-pipes, so as to be snugly received against the outer peripheries of said exhaust-pipes. Clamping-bands 53, 54, are employed to clamp the valve-casing about the exhaust-pipe.

Each of the bands is formed in two sections. The upper ends of these sections are provided with holes 55, through which the bolts nearest to the exhaust-pipe are received, there being one section of each band at each side of the casing and pipe. The lower ends of these sections are each provided with a series of holes 56, through selective ones of which a bolt 57 is received, a nut 58 together with a bolt 57 clamping the ends of the mating or pair of band-sections toward each other.

The sections of a pair of bands are stretched about the depending portions of the valve-casing and the exhaust-pipe, the lower ends being bent parallel with each other, as shown at 59, so as to place bolt-holes opposite each other to receive the bolt with the bent ends sufficiently separated to allow the clamping of the band, in order to secure the valve-casing in place. This arrangement for accommodating different diameters of exhaust-pipes is shown in Fig. 6.

One of the bands is provided with a lug 60 for receiving one end of the spring 36.

The pivot-stem and valve may be so placed that the extended shank 33 of the valve-stem extends either to the right or to the left, so as to place the operating arm 35 at either the right or the left of the exhaust-pipe, as indicated respectively in full lines and in dotted lines in Fig. 6.

In assembling my improved device, the arcuate portions of the sections of the valve-casing are bent to conform to the curvature of the exhaust-pipe about which the same are to be received. The valve is placed with its shank extending to one side or the other of the clamp, depending on which side of the exhaust-pipe the operating lever is to be placed, the valve-stem 15 being passed through the bearing holes 16 in the respective sides, with the curved arcuate portions received about the exhaust-pipe, the separating block being located between the webs 24 of the respective side-sections, with its flange 25 so formed as to conform to the curvature of the exhaust-pipe.

The sections of the clamping-bands are also preferably bent to conform to the curvature and side of the exhaust-pipe, the bolt 57 being passed through the proper ones of the holes 56 to cause a tight clamping of the curved arcuate portions of the sections of the valve casing about the exhaust-pipe, it being understood that the bolts 47, 48, 49, and the nuts therefor, have also been suitably placed, as hereinbefore explained.

The operating arm 35 is secured to the shank 33 in suitable manner to cause turning of the shank and operation of the valve upon operation of the operating arm. The spring 36 has its respective ends received in a hole in the operating lever and about the lug 60 of the clamping band, the section of the clamping-band having the lug therein having been placed at that side of the device on which the shank of the valve-stem is located. The flexible pipe 28 has also been placed in the passage, being preferably clamped therein, and further secured by the cotter-pin 29.

Having thus fully described my invention, what I claim as new, and desire to secure by Letters Patent is:

1. In a valve of the character described, the combination with the exhaust-pipe, of a valve-casing having an exhaust-passage, said valve-casing comprising a pair of sides having arcuate portions arranged to be received about said exhaust-pipe, each of said pair of sides having one of said arcuate portions, and a wall of said exhaust-passage in angular relation to said arcuate portion, a connecting web between said wall and said arcuate portion, and a connecting flange above said wall of said exhaust-passage, a block between said webs, said walls and said block forming said exhaust-passage, pairs of clamp-straps arranged to be received about said arcuate portions and said exhaust-pipe, a tension-clamp received through a pair of said straps, said webs and said block, and a tension-clamp received through another pair of said straps and said flanges, and a valve for said exhaust-passage.

2. In a valve of the character described, the combination with the exhaust-pipe provided with an opening, of a valve-casing having an exhaust-passage, said valve-casing comprising a pair of sides having arcuate portions arranged to be received about said exhaust-pipe, each of said pair of sides having one of said arcuate portions, and a wall of said exhaust-passage in angular relation to said arcuate portion, a connecting web between said wall and said arcuate portion, and a connecting flange above said wall of said exhaust-passage, a block between said webs, said walls and said block forming said exhaust-passage, said block provided with a flange next said exhaust-pipe having an edge curved to conform to the curvature of said exhaust-pipe, and means for securing said valve-casing to said exhaust-pipe at said opening in the latter.

In testimony whereof, I have hereunto signed my name in the presence of two subscribing witnesses:

TOM J. SCOTT.

In presence of—
DELMA WERNSING,
PAUL V. CONNOLLY.